US010462352B2

United States Patent
Kawarada et al.

(10) Patent No.: US 10,462,352 B2
(45) Date of Patent: Oct. 29, 2019

(54) FOCUS DETECTION APPARATUS AND IMAGE PICKUP APPARATUS

(71) Applicant: CANON KABUSHIKI KAISHA, Tokyo (JP)

(72) Inventors: Masahiro Kawarada, Tokyo (JP); Hirokazu Ishii, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/883,929

(22) Filed: Jan. 30, 2018

(65) Prior Publication Data

US 2018/0234618 A1 Aug. 16, 2018

(30) Foreign Application Priority Data

Feb. 14, 2017 (JP) .................. 2017-025380

(51) Int. Cl.
| | |
|---|---|
| H04N 5/232 | (2006.01) |
| H04N 5/374 | (2011.01) |
| H04N 5/3745 | (2011.01) |
| H04N 5/369 | (2011.01) |
| H04N 5/217 | (2011.01) |
| H04N 5/357 | (2011.01) |
| G02B 7/34 | (2006.01) |
| G02B 7/02 | (2006.01) |
| G02B 7/04 | (2006.01) |

(52) U.S. Cl.
CPC .......... *H04N 5/23212* (2013.01); *G02B 7/34* (2013.01); *H04N 5/217* (2013.01); *H04N 5/232122* (2018.08); *H04N 5/357* (2013.01); *H04N 5/36961* (2018.08); *H04N 5/374* (2013.01); *H04N 5/37457* (2013.01); *G02B 7/021* (2013.01); *G02B 7/04* (2013.01)

(58) Field of Classification Search
CPC .................................................. H04N 5/23212
USPC ........................................................ 348/345
See application file for complete search history.

(56) References Cited

U.S. PATENT DOCUMENTS

| | | | |
|---|---|---|---|
| 9,277,113 B2 * | 3/2016 | Ikedo | H04N 5/23212 |
| 2013/0010086 A1 * | 1/2013 | Iwasaki | G03B 35/08 |
| | | | 348/49 |

FOREIGN PATENT DOCUMENTS

JP 2014-089260 A 5/2014

* cited by examiner

*Primary Examiner* — Joel W Fosselman
(74) *Attorney, Agent, or Firm* — Canon U.S.A., Inc., IP Division

(57) ABSTRACT

A focus detection apparatus includes a determination unit configured to determine a degree of effect of noise included in a pair of parallax image signals, and an acquisition unit configured to acquire information about a phase difference between the pair of parallax images based on a calculation of correlation between the pair of parallax image signals. The acquisition unit selects a filter used to acquire the information about the phase difference from among a plurality of filters having different frequency characteristics based on a determination result of the determination unit, and outputs, as a focus detection result, the information about the phase difference acquired by the correlation calculation based on the pair of parallax image signals applied to the selected filter.

20 Claims, 13 Drawing Sheets

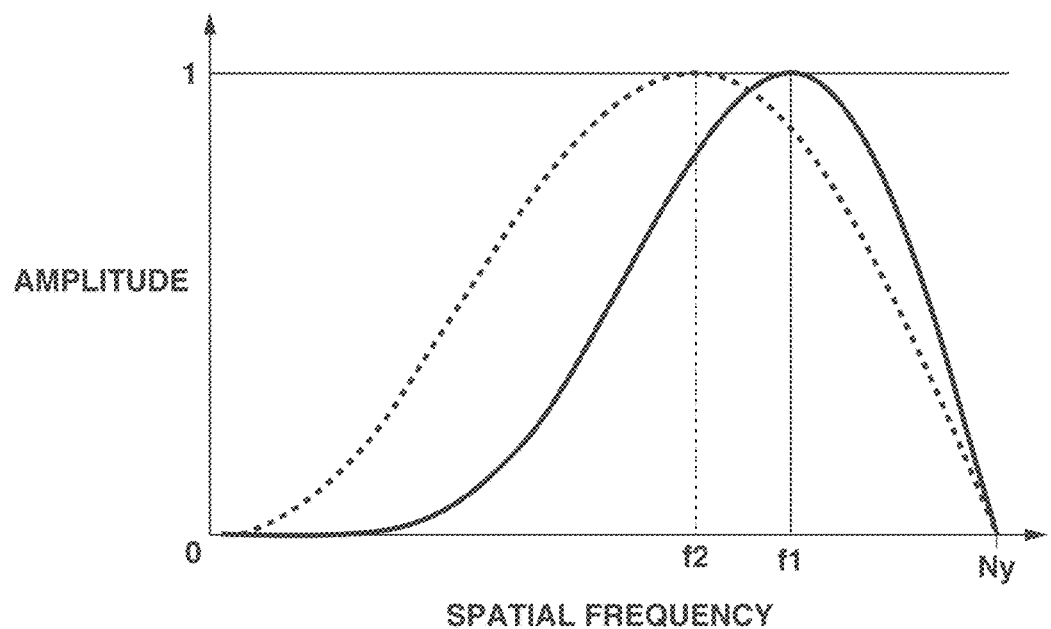

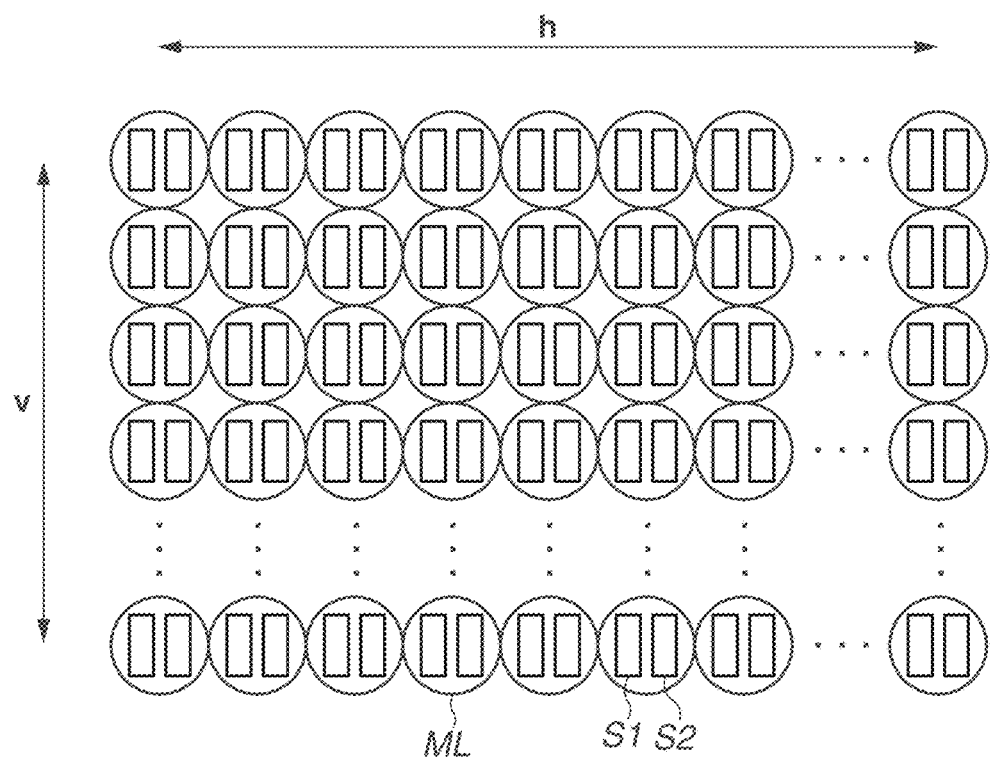

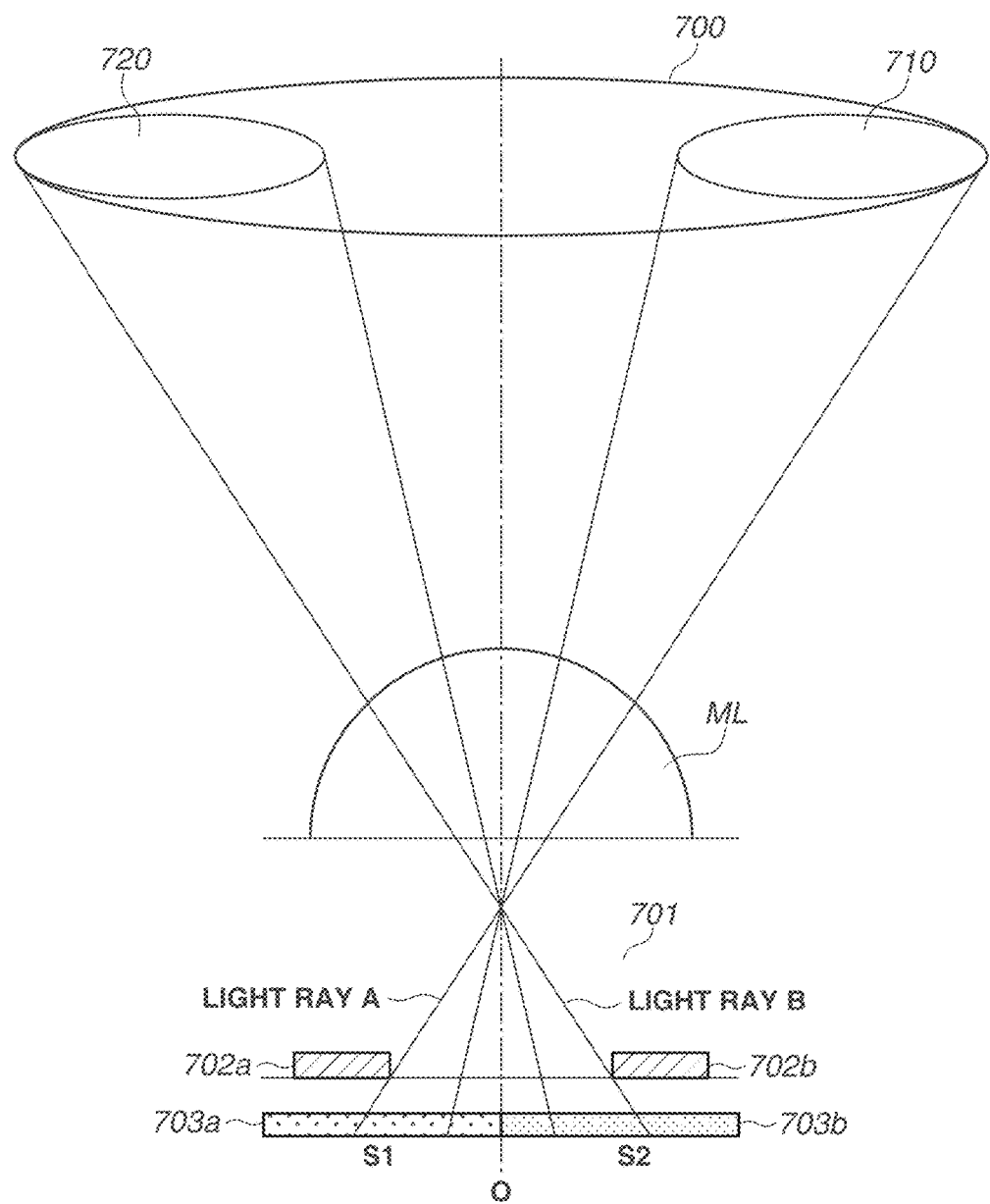

ADDITION SIGNAL
OF TWO FOCUS
DETECTION
PIXEL COLUMNS

IMAGE SIGNAL OF
FIRST FOCUS
DETECTION
PIXEL COLUMN

IMAGE SIGNAL OF
SECOND FOCUS
DETECTION
PIXEL COLUMN

ADDITION SIGNAL OF
TWO FOCUS DETECTION
PIXEL COLUMNS
(NOISE CONTAMINATION)

IMAGE SIGNAL OF FIRST
FOCUS DETECTION
PIXEL COLUMN
(NOISE CONTAMINATION)

IMAGE SIGNAL OF SECOND
FOCUS DETECTION
PIXEL COLUMN
(NOISE CONTAMINATION)

DEGREE OF MISMATCHING BETWEEN TWO IMAGES

DEGREE OF MISMATCHING BETWEEN TWO IMAGES (WHEN THERE IS NOISE CONTAMINATION)

DIFFERENCE BETWEEN DEGREES OF MISMATCHING BETWEEN TWO IMAGES CAUSED BY PRESENCE OR ABSENCE OF NOISE CONTAMINATION

FOCUS DETECTION APPARATUS AND IMAGE PICKUP APPARATUS

BACKGROUND

Field of Invention

The present disclosure relates to a focus detection apparatus and an image pickup apparatus which use a phase difference detection method.

Description of Related Art

As a focus detection method based on a phase difference detection method, conventionally, a light beam from a subject image is divided on an exit pupil surface and the divided light beams are respectively focused on a pair of pixel columns in a two-dimensional image sensor. The focus detection is performed based on a phase difference between image signals photoelectrically converted in the pair of pixel columns.

Japanese Patent Application Laid-open No. 2014-89260 discusses an image pickup apparatus that performs the focus detection based on a phase difference detection method using a two-dimensional image sensor in which microlenses are formed in respective pixels. In such an image pickup apparatus, each pixel includes a photodiode A for photoelectrically converting one image obtained by pupil division, a photodiode B for photoelectrically converting the other image, and a floating diffusion area for temporarily holding electric charges from the photodiodes A and B. Electric charge transfer from the photodiodes A and B to the floating diffusion area is controlled as follows: First, only the electric charges from the photodiode A are transferred and voltage-converted to obtain one of the pupil-divided image signals (the image signal is hereinafter referred to as an "A image signal"). Subsequently, the electric charges from the photodiode B are transferred to the floating diffusion area and voltage-converted, without resetting the floating diffusion area to obtain an image signal before the pupil division (hereinafter referred to as an "A+B image signal").

The image signal corresponding to the photodiode B on which the other pupil-divided image is incident (the image signal is hereinafter referred to as a "B image signal") is electrically obtained by subtracting the A image signal from the A+B image signal. The A image signal and the B image signal which are obtained as described above as a pair of image signals are parallax image signals. Accordingly, a focal position of a subject can be detected by calculating the phase difference between the A image signal and the B image signal by a known correlation calculation technique. Further, the A+B image signal is used for generating an image captured by an image pickup apparatus. In this manner, the image pickup apparatus discussed in Japanese Patent Application Laid-open No. 2014-89260 is capable of acquiring three types of image signals, i.e., the A image, the B image, and the A+B image, by executing a reading operation only twice. Accordingly, the speed of reading operation is increased. In addition, since the A+B image signal is generated by mixing the electric charges in the floating diffusion area, the image signal before the pupil division (A+B image signal) has lower noise than that obtained by a method of adding the A image signal and the B image signal after reading out the A image signal and the B image signal. However, appropriate correction of the effect of noise included in the parallax image signals remains desirable.

SUMMARY

According to at least one embodiment, an image pickup apparatus includes a determination unit configured to determine a degree of effect of noise included in a pair of parallax image signals, and an acquisition unit configured to acquire information about a phase difference between the pair of parallax image signals based on a calculation of correlation between the pair of parallax image signals. The acquisition unit selects, based on a determination result of the determination unit, a filter used to acquire the information about the phase difference from among a plurality of filters having different frequency characteristics, and outputs, as a focus detection result, the information about the phase difference acquired by the correlation calculation based on the pair of parallax image signals applied to the second filter.

Further features and advantage of the present disclosure will become apparent from the following description of exemplary embodiments with reference to the attached drawings.

BRIEF DESCRIPTION OF THE DRAWINGS

FIG. 2 is a graph illustrating a characteristic example of a digital filter for performing a process on a focus detection pixel column according to the first exemplary embodiment.

FIGS. 3A and 3B are schematic diagrams each illustrating a configuration of an image sensor.

DESCRIPTION OF THE EMBODIMENTS

Exemplary embodiments will be described in detail below with reference to the drawings. In the exemplary embodiments, a focus detection apparatus according to the present disclosure is applied to a lens-interchangeable digital single-lens reflex (SLR) camera. However, the focus detection apparatus according to the present disclosure can be applied to any electronic imaging processing device equipped with or connected to an image sensor capable of generating signals used for focus detection based on a phase difference detection method. Examples of electronic imaging devices include non-lens-changeable type digital cameras, video cameras, cellular phones equipped with a camera, personal computers processing images acquired from a camera, game consoles, and even household electrical appliances equipped with or connected to a camera.

The focus detection apparatus according to an exemplary embodiment described below is a focus detection apparatus that performs focus detection based on an image plane phase difference method, and determines a degree of effect of noise included in a pair of parallax image signals. In addition, the focus detection apparatus acquires information about an image shift amount obtained by a correlation calculation based on the pair of parallax image signals. Band-pass filter processing selected based on the determination result is performed on the parallax image signals. For example, if it is determined that the effect of noise is large, a band-pass filter that is less susceptible to noise and transmits relatively low frequency band signals is selected. On the other hand, if it is determined that the effect of noise is small, a band-pass filter capable of performing focus detection with a high accuracy and transmitting relatively high frequency band signals is selected. Thus, the focus detection in which the effect of noise is reduced can be performed.

Configuration of Digital Camera System

Figure 1:
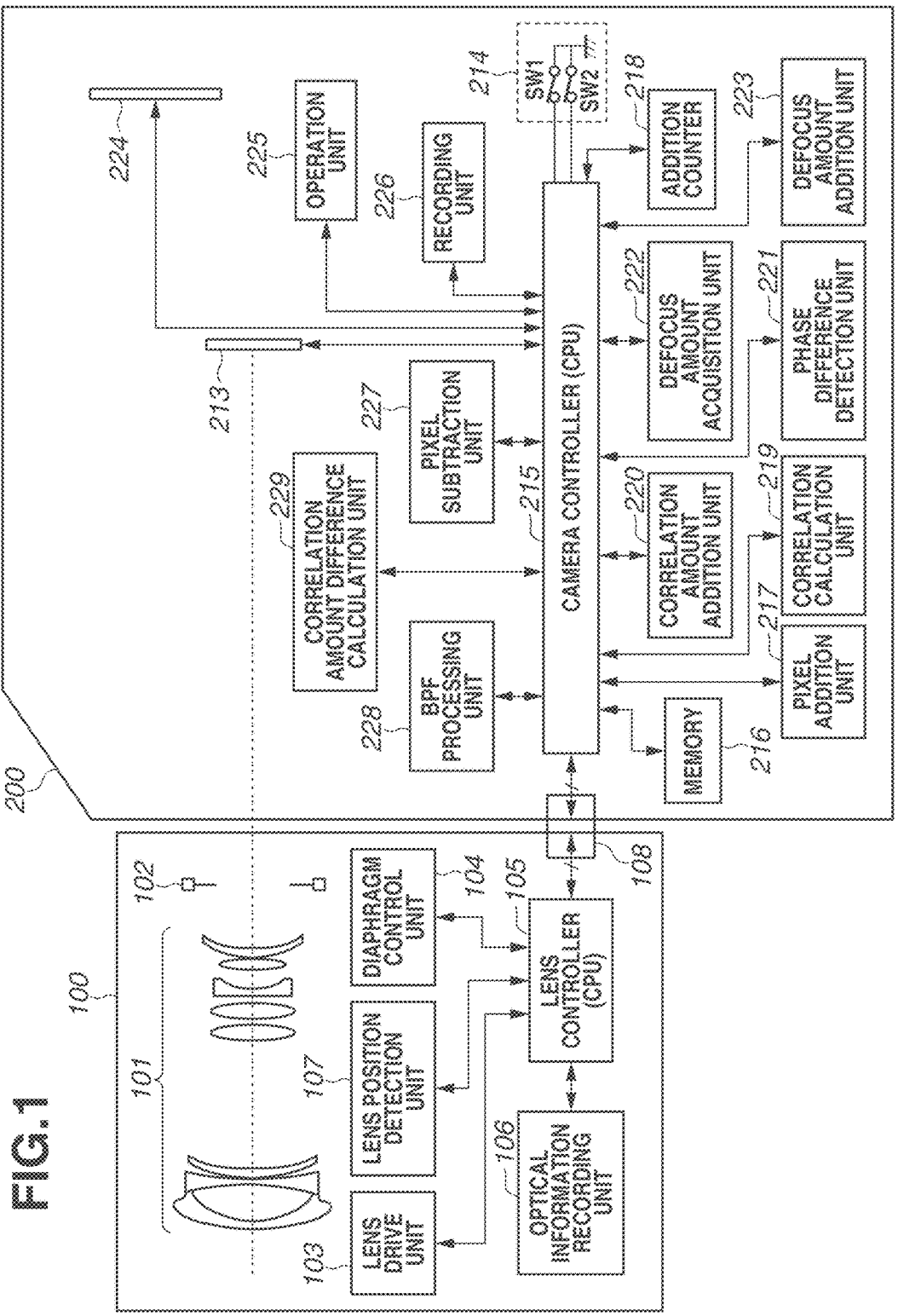
FIG. 1 is a block diagram illustrating a schematic configuration of a digital camera as an example of an image pickup apparatus according to a first exemplary embodiment.

FIG. 1 is a block diagram illustrating a schematic configuration of a digital camera system as an example of an image pickup apparatus according to a first exemplary embodiment of the present disclosure.

Referring to FIG. 1, the digital camera system includes a lens unit 100 and a camera unit 200. The lens unit 100 is detachably attached to the camera unit 200 through a lens mounting mechanism of a mounting unit (not illustrated). The mounting unit is provided with an electric contact unit 108. The electric contact unit 108 includes a terminal for a communication bus line, which allows the lens unit 100 and the camera unit 200 to communicate with each other.

The lens unit 100 includes a lens group 101 and a diaphragm 102 for controlling incident light rays. The lens group 101 constitutes an image pickup optical system and includes a focus lens and a zoom lens. The lens unit 100 also includes a lens drive unit 103 that includes a drive system and a drive system control unit. The drive system includes a stepping motor for zooming or focusing the lens group 101. The lens drive unit 103 and the drive system constitute a focus adjustment unit. The lens unit 100 also includes a diaphragm control unit 104 and an optical information recording unit 106. The diaphragm, control unit 104 controls the aperture of the diaphragm 102. The optical information recording unit 106 records various optical design values for zooming or focusing of the lens group 101 and values for the diaphragm. The lens drive unit 103, the diaphragm control unit 104, and the optical information recording unit 106 are each connected to a lens controller 105 which includes a central processing unit (CPU) for controlling the overall operation of the lens unit 100. The lens unit 100 also includes a lens position detection unit 107 that detects positional information of a lens, for example, by acquiring a phase wave form of the stepping motor included in the lens drive unit 103.

The camera unit 200 communicates with the lens unit 100 via the electric contact unit 108 to transmit a control request for controlling zooming or focusing of the lens group 101 and the aperture of the diaphragm 102, and receive control results. The camera unit 200 includes an operating switch 214 for inputting an operation into the camera unit 200. The operating switch 214 includes two-stage-stroke-type switches. A first-stage switch (SW1) is a switch for starting an image pickup preparation operation such as photometry and focus detection using captured image signals. A second-stage switch (SW2) is a switch for causing an image pickup unit 213 to start an image pickup operation such as electric charge accumulation and electric charge reading, to acquire a still image.

The image pickup unit 213 includes an image sensor, an A/D converter, and a processor that performs a development calculation. The image sensor includes a plurality of pixels each including a photoelectric conversion unit. The A/D converter converts an electrical signal output from the image sensor into an image signal as digital data Incident rays are guided to the image sensor through the lens group 101 and the diaphragm 102. The image pickup unit 213 performs a development calculation by photoelectrically converting an incident subject image to obtain captured image data. As the image sensor, a charge-coupled device (CCD) image sensor or a complementary metal oxide semiconductor (CMOS) image sensor can be used. The A/D converter may be incorporated in the image sensor. A phrase "a pixel outputs an electrical signal corresponding to an image signal" used herein may be also simply expressed as "a pixel outputs an image signal" in the present specification. At least some of the pixels included in the image sensor can output the image signal to be used for focus detection. The image signal for focus detection obtained by the image sensor is temporarily stored in a memory 216 which is connected to a camera controller 215. A pair of parallax image signals temporarily stored in the memory 216 (the pair of parallax image signals is hereinafter also referred to simply as a pair of image signals) is sent to a pixel addition unit 217 which is connected to the camera controller 215.

The pixel addition unit 217 adds the image signal obtained from the positionally corresponding pixel to the pair of image signals until the number of times counted by an addition counter 218 reaches a predetermined number of times. The pair of image signals to which the image signal is added is sent to a correlation calculation unit 219. The correlation calculation unit 219 is a correlation amount acquisition unit connected to the camera controller 215, and calculates a correlation amount (represented by a difference between the pair of image signals) for each phase shift amount of the pair of image signals by carrying out a correlation calculation. A correlation amount addition unit 220 connected to the camera controller 215 adds the calculated correlation amounts until the number of times counted by the addition counter 218 reaches the predetermined number of times. The added correlation amounts are sent to a phase difference detection unit 221 to obtain a phase difference which shows the highest correlation. As it is understood by those skilled in the art of signal processing, the term "correlation" refers to a measure of similarity of two signals as a function of a variable (e.g., the displacement of one signal relative to the other). Accordingly, when the term "phase difference" is used in the present disclosure and specification, it indicates a phase difference with a highest correlation (a phase difference indicating a minimum value of a correlation amount) between two images constituting the parallax image signals unless otherwise noted.

A defocus amount acquisition unit 222 acquires a defocus amount by a known method based on the phase difference acquired by the phase difference detection unit 221 and optical characteristics of the lens unit 100. The acquired defocus amount is sent to a defocus amount addition unit 223, and the defocus amount is added until the number of times counted by the addition counter 218 reaches the predetermined number of times.

The camera controller 215 transmits and receives control information to and from the lens controller 105 via the electric contact unit 108, and controls the focal position of the lens group 101 based on the defocus amount calculated by the defocus amount acquisition unit 222 or the defocus amount addition unit 223.

The digital camera according to the present exemplary embodiment includes a display unit 224 and an operation unit 225. The display unit 224 displays a subject image captured by the image pickup unit 213 and various operation states. The operation unit 225 switches the operation of the image pickup unit 213 to a live view mode or a moving-image recording mode. Still images or moving images captured by the image pickup unit 213 are recorded on a recording unit 226 in a predetermined data format.

The camera unit 200 also includes a pixel subtraction unit 227 and a band-pass filtering (BPF) processing unit 228 that performs one-dimensional BPF on the image signals. The pixel subtraction unit 227 receives two image signals from the image pickup unit 213 and subtracts one image signal from the other image signal. The BPF processing unit 228 includes a first filter that transmits predetermined spatial frequency characteristics, and a second filter showing a frequency band lower than the first filter as its characteristics. FIG. 2 illustrates an example of spatial frequency characteristics of the first and second filters.

In FIG. 2, the spatial frequency characteristics of the first filter are represented by a solid line, and the spatial frequency characteristics of the second filter are represented by a dashed line. "Ny" in FIG. 2 represents Nyquist frequencies of a pair of focus detection pixel columns. The first filter has spatial frequency characteristics having a maximum amplitude at a frequency f1. The second filter has spatial frequencies having a maximum amplitude at a frequency f2 which is lower than the frequency f1. Accordingly, it can be seen that the second filter is a band-pass filter that transmits signals in a frequency range lower than the first filter. In addition, the BPF processing unit 228 performs a normalization operation on the maximum amplitudes of the first and second filters after the filter operation is performed. Therefore, the value of a maximum amplitude of the first and second filters is both "1".

The camera unit 200 also includes a storage area for temporarily storing only two sets of correlation amounts for each phase difference calculated by the correlation calculation unit 219. Further, the camera unit 200 includes a correlation amount difference calculation unit 229 that calculates a correlation amount difference in any phase shift amount between two sets of correlation amounts. The correlation amount difference calculation unit 229, together with the camera controller 215, functions as a determination unit that determines a degree of effect of noise included in a pair of parallax image signals.

Next, the configuration of the image sensor included in the image pickup unit 213 will be described with reference to FIGS. 3A and 3B and FIGS. 4A and 4B.

FIG. 3A is a schematic diagram illustrating a light receiving surface of the image sensor as viewed from an includes a first sub-pixel S1 and a second sub-pixel S2. A pair of rays divided on the exit pupil surface is respectively incident on the first sub-pixel S1 and the second sub-pixel S2. A light beam, passing through a first pupil area 710 of an exit pupil 700 is incident on the first sub-pixel S1, and a light beam passing through a second pupil area 720 of the exit pupil is incident on the second sub-pixel S2. A microlens ML for focusing light is disposed on the front surface of each of the first sub-pixel S1 and the second sub-pixel S2. Each pixel includes a set of the first sub-pixel S1, the second sub-pixel S2, and the microlens ML. h pixels in a horizontal direction and v pixels in a vertical direction are arranged on the light receiving surface of the image sensor. Image signals from the first and second sub-pixels S1 and S2 can be used for focus detection, and an image signal from a unit pixel can be used for image capturing. The first sub-pixel and the second sub-pixel that form the same pixel may be referred to as a pair of sub-pixels. Light beams passing through the same microlens ML are respectively incident on the pair of sub-pixels.

FIG. 3B is a sectional view of each pixel illustrated in FIG. 3A. The microlens ML, a smoothing layer 701, which constitutes a plane for arranging the microlens ML, light shielding layers 702 (702a, 702b), and first and second photodiodes 703a and 703b are formed in this order from the light incident side (upper side in FIG. 3B). The light beam A passing through the first pupil area 710 of the exit pupil 700 is incident on the first photodiode 703a, and the light beam B passing through the second pupil area 720 is incident on the second photodiode 703b. The light shielding layer 702 is located so as to prevent unwanted oblique rays from entering the photoelectric conversion area 703a of the first focus detection pixel S1 and the photoelectric conversion area 703b of the second focus detection pixel S2. With such a pixel configuration, the pupil of the image pickup optical system is symmetrically divided and image signals respectively corresponding to the divided light beams can be obtained.

Figure 4A:
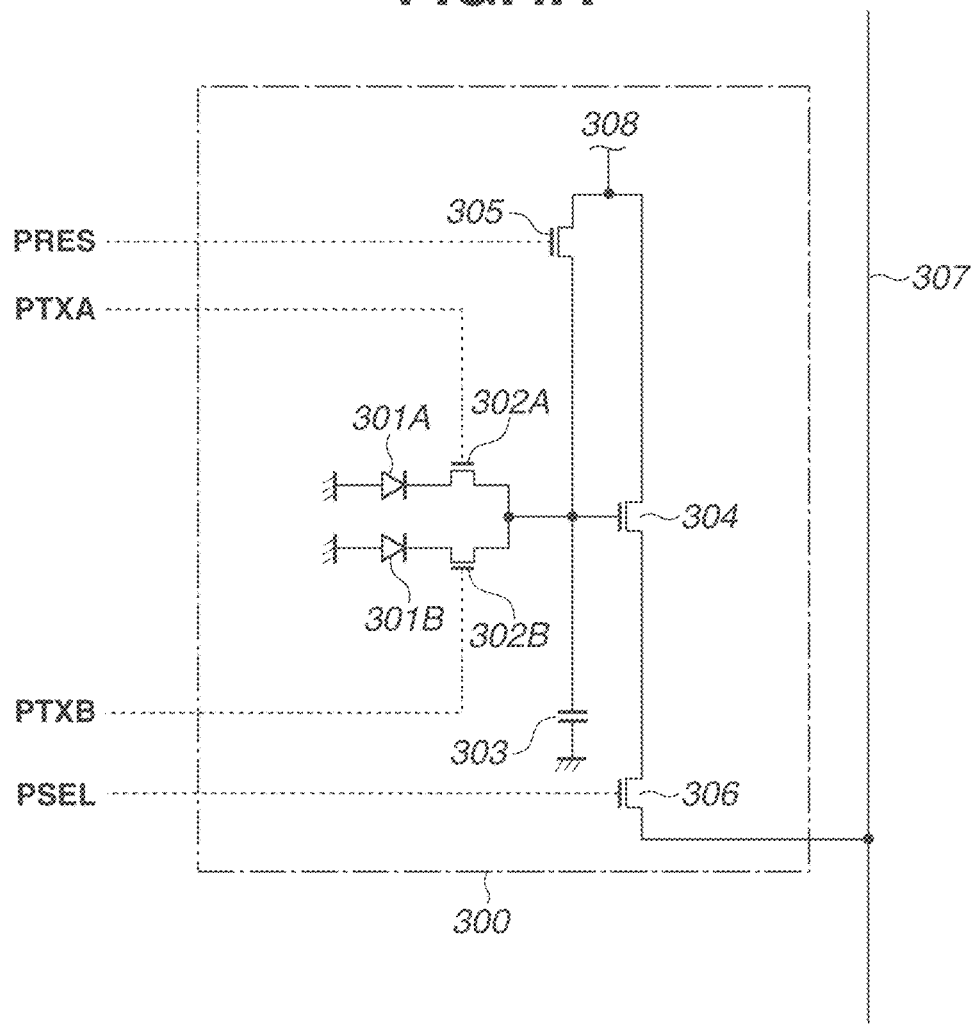
FIG. 4A illustrates a circuit configuration of a pixel of the image sensor.

Next, a circuit configuration of each pixel of the image sensor will be described with reference to FIG. 4A. A pixel 300 includes a first photodiode 301A, a second photodiode 301B, a first transfer switch 302A, a second transfer switch 302B, and a floating diffusion area 303. The unit pixel 300 also includes an amplification unit 304, a reset switch 305, and a selection switch 306. The pixel 300 also includes a common power supply VDD 308. The first photodiode 301A and the first transfer switch 302A constitute the first sub-pixel S1, and the second photodiode 301B and the second transfer switch 302B constitute the second sub-pixel S2.

The first and second photodiodes 301A and 301B photoelectrically convert the light rays, which have passed through the same microlens ML and are respectively incident on the first and second photodiodes 301A and 301B, into corresponding electric signals. The first and second transfer switches 302A and 302B control the electric charges generated by the first and second photodiodes 301A and 301B to be selectively transferred to the common floating diffusion area 303. The first and second transfer switches 302A and 302B are controlled by first and second transfer pulse signals PTXA and PTXB, respectively. The floating diffusion area 303 temporarily holds the electric charges transferred from the first and second photodiodes 301A and 301B, and converts the electric charges it holds, into a voltage signal. The amplification unit 304, which includes a source follower MOS transistor, amplifies the voltage signal based on the electric charges held in the floating diffusion area 303, and outputs the amplified voltage signal as a pixel signal. The reset switch 304 resets the potential of the floating diffusion area 303 to a reference potential VDD. The reset switch 305 is controlled by a reset pulse signal PRES. The selection switch 306 controls the output of the pixel signal from the amplification unit 304 to a vertical output line 307. The selection switch 306 is controlled by a vertical selection pulse signal PSEL.

Figure 4B:
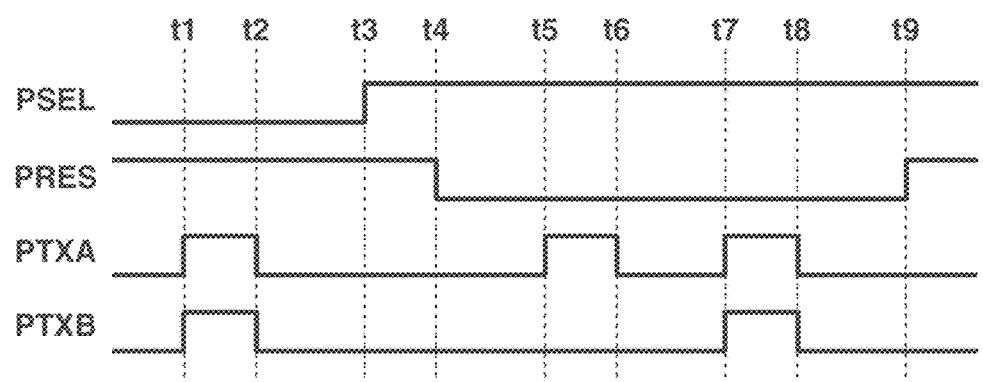
FIG. 4B illustrates a drive timing chart.

Next, an operation for driving the circuit of the unit pixel 300 illustrated in FIG. 4A will be described with reference to a drive timing chart illustrated in FIG. 4B. First, the first and second photodiodes 301A and 301B are reset during a period from time t1 to time t2. At the time t2, the first and second photodiodes 301A and 301B start accumulating electric charges. After the electric charges are accumulated for a necessary period of time based on a desired exposure amount, at time t3, the selection switch 306 is turned on. At time t4, the reset state of the floating diffusion area 303 is released. During a period from time t5 to time t6, the first transfer switch 302A is turned on to transfer the electric charges of the first photodiode 301A to the floating diffusion area 303. At the time t6, the electric charge accumulated in the first photodiode 301A are read out to the floating diffusion area 303. When the electric charges are read out, a voltage signal corresponding to a change in potential is output, as a first focus detection pixel signal, to the vertical output line 307 through the amplification unit 304 and the selection switch 306. During a period from time t7 to time t8, the first and second transfer switches 302A and 302B are turned on. As a result, the electric charges of the first and second photodiodes 301A and 301B are simultaneously transferred to the floating diffusion area 303. At the time t8, the transferred electric charges are read out to the floating diffusion area 303. When the electric charges are read out, a voltage signal corresponding to a change in potential is output, as an addition signal of the first and second focus detection pixel signal, to the vertical output line 307 through the amplification unit 304 and the selection switch 306. At time t9, the floating diffusion area 303 is reset.

The above-described operations are sequentially carried out for each unit pixel, and then the operation of reading out the image signal acquired from the pixel column of the first sub-pixel, and the addition signal of the image signals acquired from the pixel columns of the first and second sub-pixels is completed.

The image signal acquired from the pixel column of the first sub-pixel, and the addition signal of the image signals acquired from the pixel columns of the first and second sub-pixels, which are read out as described above, are input to the pixel subtraction unit 227, and the image signal acquired from the pixel column of the second sub-pixel is electrically generated. In the present specification, the image signal acquired from the pixel column of the first sub-pixel is referred to as an A image signal, the image signal acquired from the pixel column of the second sub-pixel is referred to as a B image signal, and the image signals acquired from the pixel columns of the first and second sub-pixel are referred to as an A+B image signal. The B image signal is deemed to be obtained from the second sub-pixel or the second photodiode 301B even in a case where the B image signal is in effect obtained indirectly without reading out singly the B image signal, as described in the present exemplary embodiment.

Relationship Between a Phase Difference and a Defocus Amount

A phase difference (also referred to as an image shift amount) between two images, which constitute a pair of parallax image signals and are acquired by a correlation calculation, and a defocus amount have a proportional relation, and the defocus amount monotonously increases as the phase difference increases. The direction of the phase difference corresponds to the direction of the defocus amount (closest distance side/infinite distance side). The term "a phase difference between a pair of parallax image signals" described herein refers to a phase difference when the correlation between a pair of parallax image signals is the highest (i.e., the correlation amount takes a minimum value) unless otherwise noted, in the present disclosure and specification. The phase difference can be converted into a defocus amount by a known method. In addition, a distance to a subject can be calculated based on the defocus amount and a magnification relation of the lens group 101.

Effects of Noise Contamination in One of the Image Signals Obtained by Pupil Division, on the Other Image Signals Next, the image signals and the correlation amount when there is noise contamination in the first or second sub-pixel column will be described.

Figure 5:
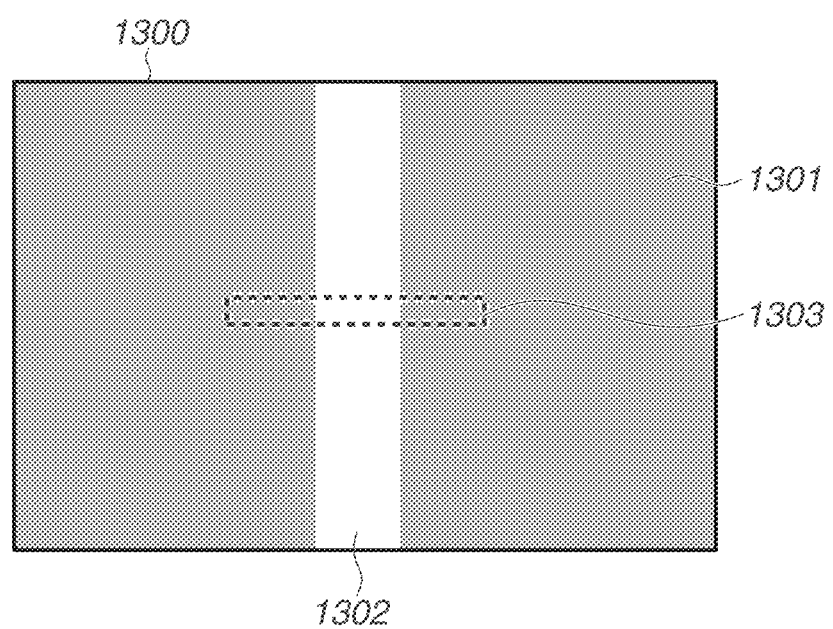
FIG. 5 illustrates a pattern subject used for describing an output of noise appearing in an image signal.

FIG. 5 illustrates a pattern subject 1300 represented by a simple graphic pattern for ease of explanation. The pattern subject 1300 includes a gray portion 1301 and a white portion 1302. FIG. 5 illustrates a pixel column area (so-called focus detection area) 1303 which is used for focus detection and noted for the sake of description.

Figure 6A:
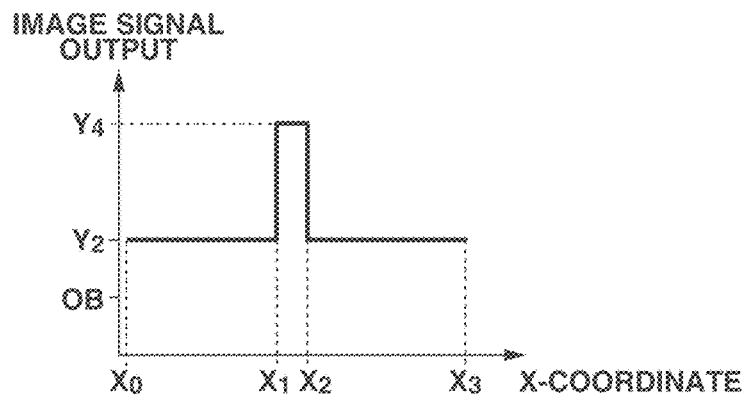
FIG. 6A is a graph illustrating an addition signal of the first and second focus detection pixel columns.
Figure 6B:
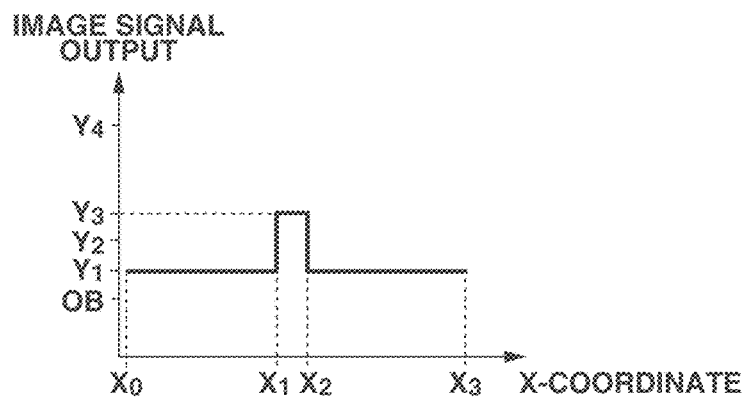
FIGS. 6B and 6C are graphs respectively illustrating image signals from first and second focus detection pixel columns on the pattern subject.
Figure 6C:
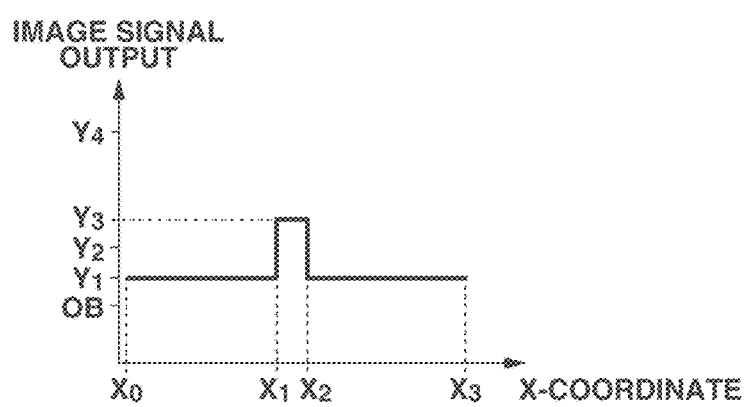

FIG. 6B is a graph illustrating the A image signal for the pattern subject 1300 illustrated in FIG. 5. FIG. 6C is a graph illustrating the B image signal for the pattern subject 1300. FIG. 6A is a graph illustrating the A+B image signal for the pattern subject 1300. Assume that there is no phase difference between the A image signal and the B image signal in an in-focus state of the lens group 101.

FIG. 6A is a graph illustrating the A+B image signal as the addition signal. An image signal output of the low-brightness gray portion 1300 in intervals between X-coordinates, from $X_0$ to $X_1$ and from $X_2$ to $X_3$ in the horizontal direction, is represented by $Y_2$. An image signal output of the high-brightness white portion 1302 in an interval from $X_1$ to $X_2$ is represented by $Y_4$. Even in a state where there is no incident light amount, a constant signal value is added due to the effect of a dark current generated in the image pickup unit 213, and thus the signal level is represented by OB.

FIG. 6B is a graph illustrating the A image signal, and FIG. 6C is a graph illustrating the B image signal. In FIGS. 6B and 6C, an image signal output of the low-brightness gray portion 1301 in intervals between X-coordinates, from $X_0$ to $X_1$ and from $X_2$ to $X_3$, in the horizontal direction is represented by $Y_1$. An image signal output of the high-brightness white portion 1302 in an interval between X-coordinates, from $X_1$ to $X_2$, is represented by $Y_3$. The image signal output $Y_1$ is an intermediate value between the image signal output $Y_2$ and OB. The image signal output $Y_3$ is an intermediate value between the image signal output $Y_4$ and OB.

Figure 7A:
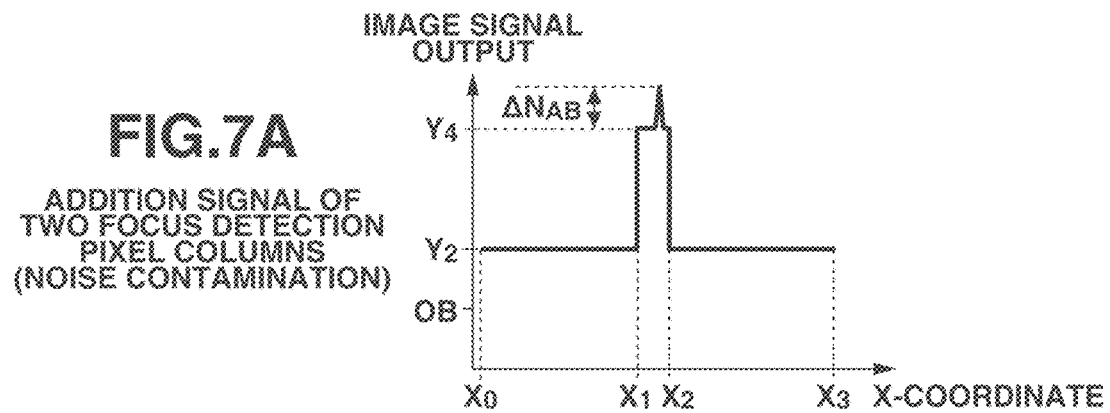
FIG. 7A is a graph illustrating an addition signal of the first and second focus detection pixel columns with reduced noise contamination.
Figure 7B:
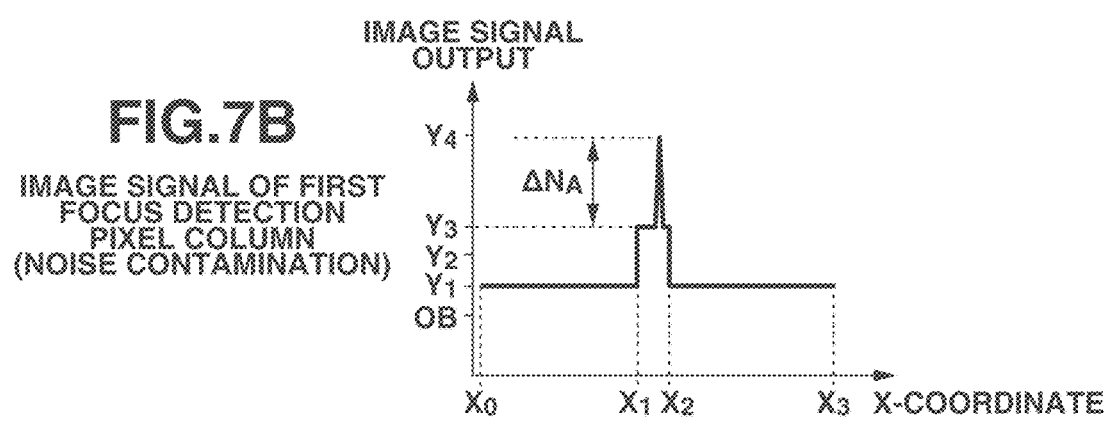
FIGS. 7B and 7C are graphs respectively illustrating image signals from first and second focus detection pixel columns when there is noise contamination.
Figure 7C:
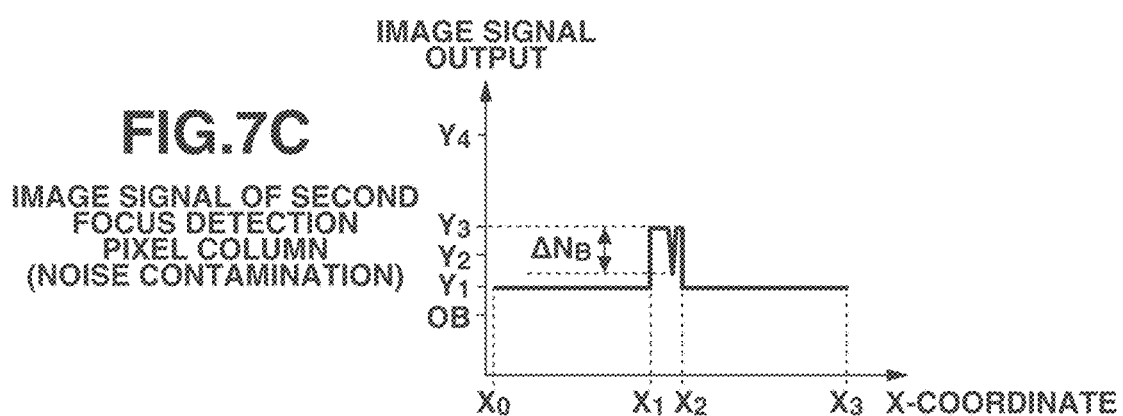

FIG. 7C is a graph illustrating the B image signal, when contaminations by independent noises occur in the A image signal illustrated in FIG. 6B and the A+B image signal illustrated in FIG. 6A.

In the image pickup unit 213 according to the present exemplary embodiment, timing for voltage-converting only the electric charges of the first sub-pixel column and timing for voltage-converting the electric charges of the addition signal of the first and second sub-pixel columns are different in the floating diffusion area 303. Accordingly, noise added to the electric charges of the first sub-pixel column does not necessarily match noise added to the electric charges of the addition signal. For this reason, FIGS. 7A to 7C illustrate a case where there is the contamination by independent noise in the respective signals.

Contaminating noise in the A+B image signal is schematically represented by noise $\Delta N_{AB}$ (shown in FIG. 7A). Contaminating noise in the A image signal is schematically represented by noise $\Delta N_A$ (shown in FIG. 7B). Contaminating noise in the B image signal is schematically represented by noise $\Delta N_B$ (shown in FIG. 7C). In this case, the B image signal (FIG. 7C) is obtained by electrically subtracting the A image signal (FIG. 7B) from the A+B image signal (FIG. 7A). Accordingly, the B image signal $(B+\Delta N_B)$ is a signal represented by the following formula 1.

$$B+\Delta N_B=(A+B+\Delta N_{AB})-(A+\Delta N_A)=B+\Delta N_{AB}-\Delta N_A$$
$$\text{hence, } N_B=\Delta N_{AB}-\Delta N_A \quad \text{(Formula 1)}$$

A: a signal based on electric charges generated by the first photodiode (a signal obtained by eliminating the noise from the A image signal)

B: a signal based on electric charges generated by the second photodiode (a signal obtained by eliminating the noise from the B image signal)

$\Delta N_{AB}$: noise superimposed on the addition signal
$\Delta N_A$: noise superimposed on the A image signal
$\Delta N_B$: noise superimposed on the B image signal As can be seen from a comparison between FIG. 7B and FIG. 7C, the noise $\Delta N_A$ and the noise $\Delta N_B$ are generated such that positive and negative directions of the signal output level are reversed and the correlation between the image signals is lowered as compared with configurations of FIGS. 6B and 6C in which there is no noise contamination.

Figure 8A:
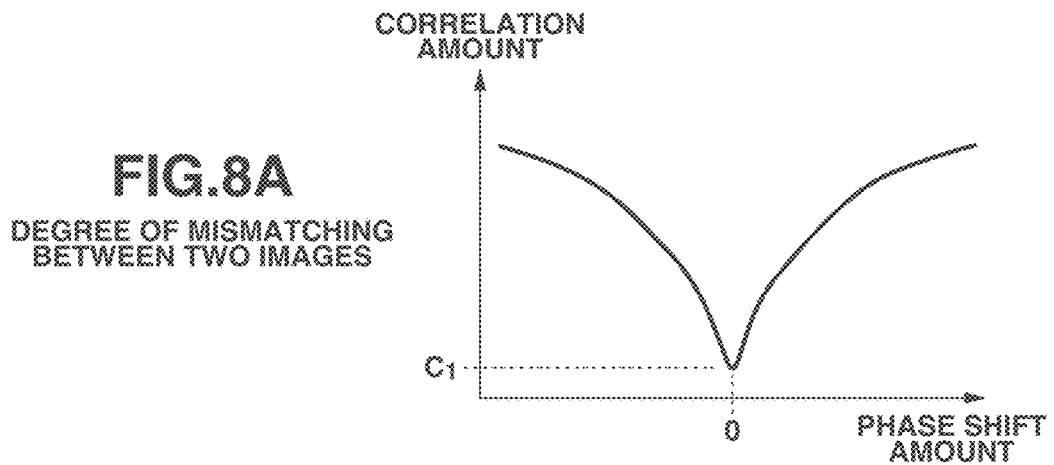
FIGS. 8A, 8B, and 8C are graphs each illustrating a correlation between first and second sub-pixel columns for each phase shift amount.
Figure 8B:
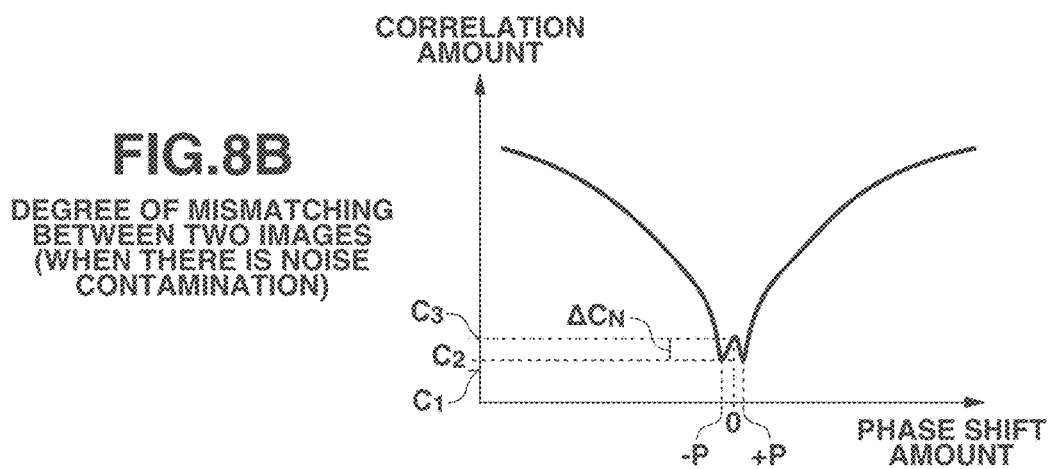
Figure 8C:
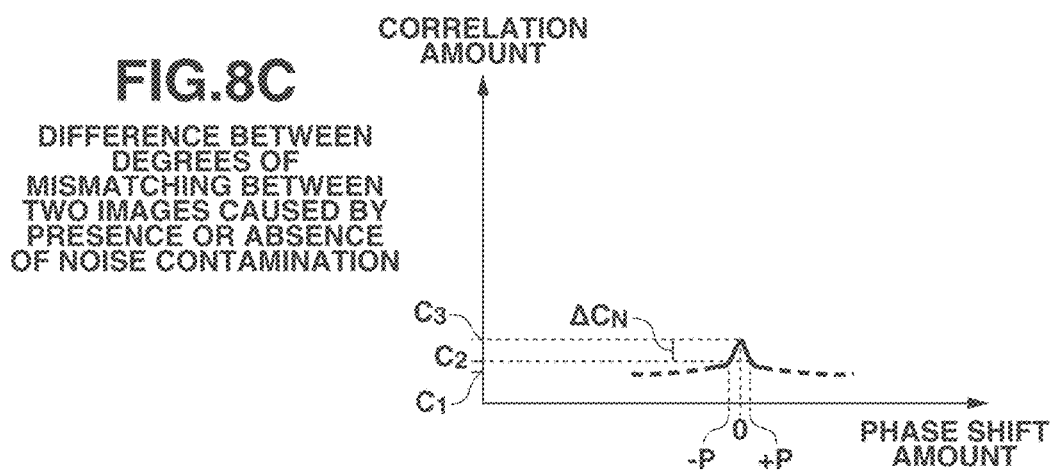

FIGS. 8A, 8B, to 8C each illustrate a correlation curve obtained by performing a correlation calculation on a pair of parallax image signals. FIG. 8A illustrates a correlation curve of each of the A image signal and the B image signal illustrated in FIGS. 6A to 6C. FIG. 8A is a graph in which the horizontal axis represents a phase shift amount and the vertical axis represents a correlation amount (a difference between two images). In FIG. 8A, the lens group 101 is in an in-focus state, and thus the correlation amount is a minimum value of $C_1$ when the phase shift amount is zero (there is no difference between the two images).

FIG. 8B is a correlation curve of each of the A image signal and the B image signal illustrated in FIGS. 7A to 7C. In FIG. 8B, since there is contamination with the noise $\Delta N_A$ and the noise $\Delta N_B$ in the A image signal and the B image signal, the correlation amount increases (correlation is above $C_1$) in a range of values ±P of the phase shift amount across a value zero. The correlation amount is $C_2$ when the phase shift amount has a value of ±P. However, at the position where the phase shift amount is zero, the correlation amount is increased by an amount equal to $\Delta C_N$ above $C_2$ and reaches a correlation value $C_3$. If such a correlation amount is obtained, although it has to be determined that the correlation is the highest when the phase shift amount is zero, actually it is determined that the correlation is the highest when the phase shift amount is −P or +P, so that an error occurs. Occurrence of such an error in the correlation amount may cause a deterioration in accuracy of focus detection and/or occurrence of "hunting" during focus detection.

FIG. 8C is a graph illustrating a difference between the correlation amounts illustrated in FIGS. 8A and 8B in the range of the phase shift amount of −P to +P and the vicinity thereof. When the difference between the correlation amounts is calculated, a local maximum is obtained at a phase shift amount of 0 as a result of increase in the correlation amount due to the noise contamination. When the amount of the noise contamination is increased, the correlation deteriorates and the correlation amount at the position corresponding to the phase shift amount of 0, i.e., the value $C_3$, increases. Accordingly, the correlation amount difference $\Delta C_N$ caused by a difference between the presence and absence of noise contamination is increased. Accordingly, it is advantageous to determine the difference in correlation amount caused by a difference between the presence and absence of noise contamination in the parallax image signals.

Operation of Digital Camera System

Figure 9:
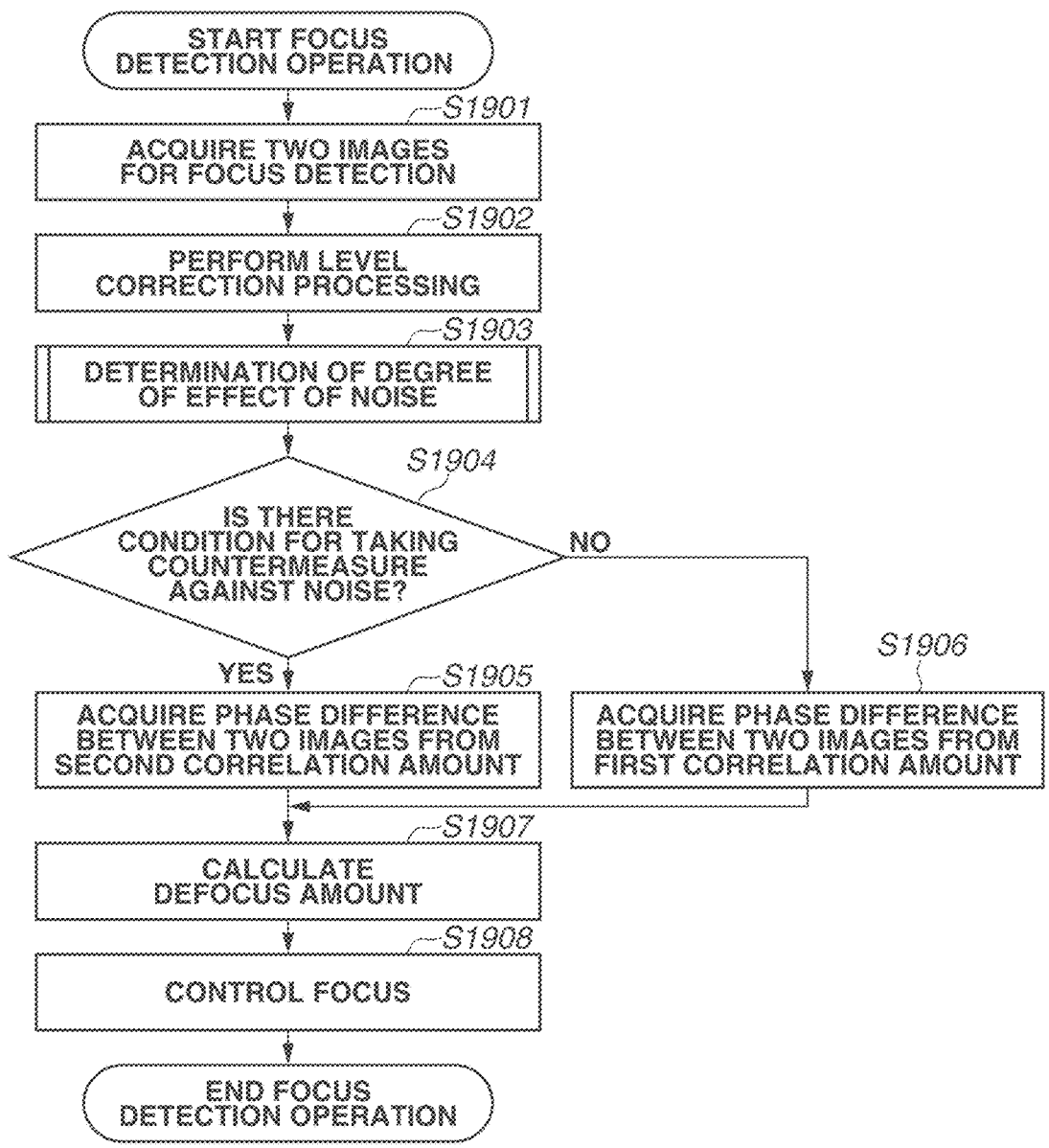
FIG. 9 is a flowchart illustrating a focus detection operation of the digital camera according to the first exemplary embodiment.

FIG. 9 is a flowchart illustrating a focus detection operation of the digital camera system according to the present exemplary embodiment. This operation is implemented in such a manner that the camera controller 215 controls each unit.

In the digital camera system according to the present exemplary embodiment, after power-on, the operation mode is automatically set to the live view mode, and the A image signal and the A+B image signal are generated while images are continuously captured by the image pickup unit 213. In addition, the subject image based on the A+B image signal is displayed on the display unit 224.

First, the first-stage switch SW1 of the operating switch 214 is pressed and a focus detection instruction is issued to start the focus detection operation.

In step S1901, the A image signal and the B image signal are acquired. In this step, the A image signal and the A+B image signal are transferred from the image pickup unit 213 to the pixel subtraction unit 227. The A image signal and the B image signal may also be referred to as two images. The pixel subtraction unit 227 electrically subtracts the A image signal from the A+B image signal, thereby acquiring the B image signal. Thus, the A image signal and the B image signal which are independent from each other are acquired. After the acquisition, the processing proceeds to step S1902.

In step S1902, correction processing for suppressing various types of signal level variations such as a decrease in marginal illumination caused by a black level correction or the image pickup optical system, is performed on the two images independently. Variations in signal levels are caused because a ray from a subject image is divided on the exit pupil surface and rays of different angles are respectively incident on the pixel columns of the first sub-pixel S1 and the second sub-pixel S2. After the correction processing, the processing proceeds to step S1903.

In step S1903, the degree of effect of noise described above with reference to FIGS. 7A to 7C and FIGS. 8A to 8C on the correction calculation is determined. The determination processing will be described in detail with reference to FIG. 10.

Figure 10:
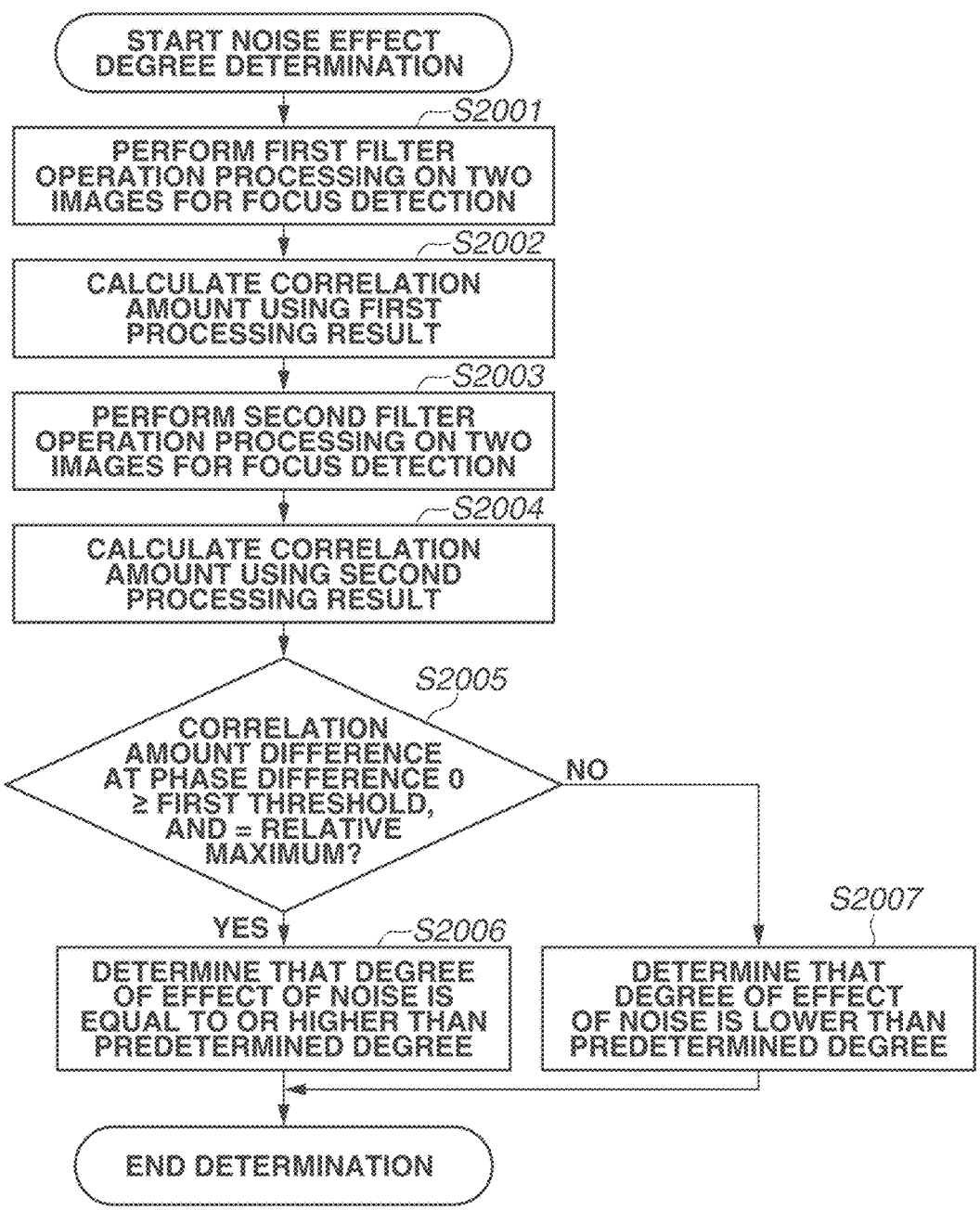
FIG. 10 is a flowchart illustrating a process of determining a degree of effect of noise according to the first exemplary embodiment.

In FIG. 10, at step S2001, the BPF processing unit 228 performs first filter processing on a pair of focus detection pixel columns, and outputs the processing result to the correlation calculation unit 219. After the output, the processing proceeds to step S2002.

In step S2002, the correlation calculation unit 219 performs a correlation calculation using the pair of focus detection pixel columns that has been subjected to the filter processing and acquired in step S2001, and calculates a correlation amount (first correlation amount) for each phase difference. The calculated first correlation amount is output to the correlation amount difference calculation unit 229. After the output, the processing proceeds to step S2003.

In step S2003, the BPF processing unit 228 performs second filter processing showing a frequency characteristics lower than the first filter on the pair of focus detection pixel columns, and outputs the processing result to the correlation calculation unit 219. After the output, the processing proceeds to step S2004.

In step S2004, the correlation calculation unit 219 performs a correlation calculation on the pair of focus detection pixel columns that has been subjected to the filter processing and acquired in step S2003, and calculates a correlation amount (second correlation amount) for each phase difference. The calculated second correlation amount is output to the correlation amount difference calculation unit 229. After the second correlation amount is output, the processing proceeds to step S2005. Since the second correlation amount is calculated by a correlation calculation using signals in a frequency range lower than the first correlation amount, the correlation amount is obtained in which the effect of noise is lower than the first correlation amount.

In step S2005, the correlation amount difference calculation unit 229 calculates a correlation amount difference between the first and second correlation amounts at the phase difference of zero, and determines whether the calculation result is equal to or greater than a first threshold. In addition, the correlation amount difference calculation unit 229 calculates a difference between the first correlation amount and the second correlation amount in a predetermined phase difference shift amount range including the phase difference of zero, and determines whether a local maximum can be obtained at the phase difference of zero. If the correlation amount difference at the phase difference of zero is equal to or greater than the first threshold and is the local maximum (YES in step S2005), the processing proceeds to step S2006. If not (NO in step S2005), the processing proceeds to step S2007.

In step S2006, as described above with reference to FIGS. 7A to 7C and FIGS. 8A to 8C, the camera controller 215 determines that the degree of effect of correlation noise appearing in the vicinity of the position corresponding to the phase difference of zero is equal to or higher than a predetermined degree and the correlation between two images is largely decreased, and the sub-routine operation is terminated.

On the other hand, in step S2007, the camera controller 215 determines that the degree of effect of correlation noise appearing in the vicinity of the position corresponding to the phase difference of zero is lower than the predetermined degree and a decrease in the correlation between two images is small. Thus, the sub-routine operation is terminated.

Referring again to the flowchart of FIG. 9, in step S1904, the camera controller 215 determines whether a condition for taking a countermeasure against noise is met on the basis of the determination result obtained in step S1903. In step S1903, if the degree of effect of noise is equal to or higher than a predetermined degree (YES in step S2005), the processing proceeds to step S1905. On the other hand, in step S1903, if it is determined that the degree of effect of noise is lower than the predetermined degree (NO in step S2005), the processing proceeds to step S1906.

In step S1905, the phase difference detection unit 221 acquires a phase difference showing the highest correlation amount between two images which constitute a pair of parallax image signals based on the second correlation amount in order to reduce the effect of noise in focus detection. The second correlation amount is calculated by the second filter showing spatial frequency characteristics of a lower range than that of the first filter. After the phase difference is acquired, the processing proceeds to step S1907.

When the effect of noise on the focus detection is small, after the phase difference is acquired, the processing proceeds to step S1906. Therefore, in step S1906, a phase difference having the highest correlation amount between two images constituting a pair of parallax image signals is acquired based on the first correlation amount calculated by the first filter showing spatial frequency characteristics of a higher range in order to increase the accuracy of detecting the phase difference while holding edge components of the subject image as much as possible. After the acquisition of the phase difference, the processing proceeds to step S1907. More specifically, in steps S1904 to S1906, a band-pass filter used to acquire the phase difference is selected from the first and second filters depending on the determination result as to the degree of effect of noise in step S1903.

In step S1907, the defocus amount acquisition unit 222 acquires a defocus amount by a known method based on the phase difference acquired in step S1905 or S1906, and the optical characteristics of the lens unit 100. The acquired defocus amount is sent to the defocus amount addition unit 223, and the defocus amount is added a predetermined number of times while the number of times is counted by the addition counter 218. Addition processing is performed to suppress variations in phase difference detection. After the addition, the processing proceeds to step S1908.

In step S1908, the focal position of the lens group 101 is controlled based on the defocus amount that is calculated by the defocus amount addition unit 223 and output from the focus detection apparatus, thereby performing a focus adjustment.

The above-described operations enable determination of the degree of effect of correlation noise on the focus detection. In addition, an appropriate filter using the determination result is selected, so that the focus detection can be performed in which the effect of correlation noise is reduced.

Modified Example of First Exemplary Embodiment

A modified example for step S1903 will now be described. According to the first exemplary embodiment, in step S1903, the degree of effect of noise is determined based on the magnitude of the difference between the first correlation amount and the second correlation amount and based on a position of the local maximum by using the first and second filters having different spatial frequency characteristics. However, various information may be added as information based on which the degree of effect of noise is determined.

For example, an intensity of a pair of parallax image signals may be added. Specifically, a determination as to whether a maximum value or an average value of image signals of at least one of two images constituting the pair of parallax image signals is equal to or smaller than a second threshold can be added. The determination may be added to the determination in step S2005. It may be determined that the effect of noise is large only when the correction amount difference at the position corresponding to the phase shift amount of zero is equal to or larger than the first threshold and is a local maximum, and the intensity of the pair of parallax image signals is equal to or less than the second threshold. The addition of such an operation can reduce the possibility of an erroneous determination that the effect of noise is large, when the difference between the first and second correlation amounts increases due to entering of a subject having a high frequency characteristic, under a condition that the image signal level is high and the degree of effect of noise is relatively low.

Instead of the intensity of the pair of parallax image signals, an intensity of an image signal for recording (a signal based on the A+B image signal) may be used as information based on which the degree of effect of noise is determined. The captured image signals acquired by the image sensor, such as the pair of parallax image signals and the image signal for recording, are referred to as captured image signals, and a signal based on the addition signal is referred to as an image pickup signal in the present specification and disclosure.

An exposure value (EV) at an apex value may be acquired based on an electric charge accumulation time of the image sensor included in the image pickup unit 213 and a diaphragm value of the diaphragm 102, and it may be determined that the effect of noise is large only when the EV is equal to or less than a third threshold.

In addition, it may be determined that the effect of noise is large only when ISO is equal to or greater than a fourth threshold.

Next, a modified example for step S2005 will be described. According to the first exemplary embodiment, in step S2005, it is determined whether the correlation amount difference is equal to or greater than a predetermined threshold at the phase difference of zero. However, reverse waveform noise such as $\Delta C_N$ appears not only at the position corresponding to the phase difference of zero, but is distributed in a range of phase shift amounts of −P to +P about the phase difference of zero. For this reason, instead of calculating the difference between the first and second correlation amounts at the phase difference of zero, the correlation amount difference may be calculated in a predetermined phase shift amount range about the phase difference of zero. The operation as described above enables more accurate determination as to whether the effect of noise is large. In addition, a correlation amount difference in the vicinity of the phase difference of zero can be used instead of the correlation amount difference at the phase difference or zero.

Further, in first exemplary embodiment, the phase difference is acquired in step S1905 or S1906 based on the correlation amount calculated in step S1903, but instead the correlation calculation may be carried out again in step S1905 or S1906. While with this operation, the amount of operation increases, the phase difference can be acquired using a filter different from the first and second filters used in step S1903. Therefore, filters suitable for detection of noise (first and second filters) and filters suitable for acquiring the phase difference (filters used for steps S1905 and S1906, which are referred to as third and fourth filters) can be selected. In addition, when a plurality of thresholds for the difference between the first and second correlation amounts is set, the degree of effect of noise can be evaluated at three or more stages to select filters to be used to acquire the phase difference from among three or more band-pass filters depending on the evaluation result.

In step S1907, the defocus amount is acquired from the phase difference between two images, but instead a drive amount (a migration length, the number of pulses, etc.) necessary for causing a lens to directly move to an in-focus position may be acquired from the phase difference. Information acquired from the phase difference, such as a phase difference, a defocus amount, and a drive amount necessary for causing the lens to move to the in-focus position, is referred to as information about the phase difference.

Figure 11:
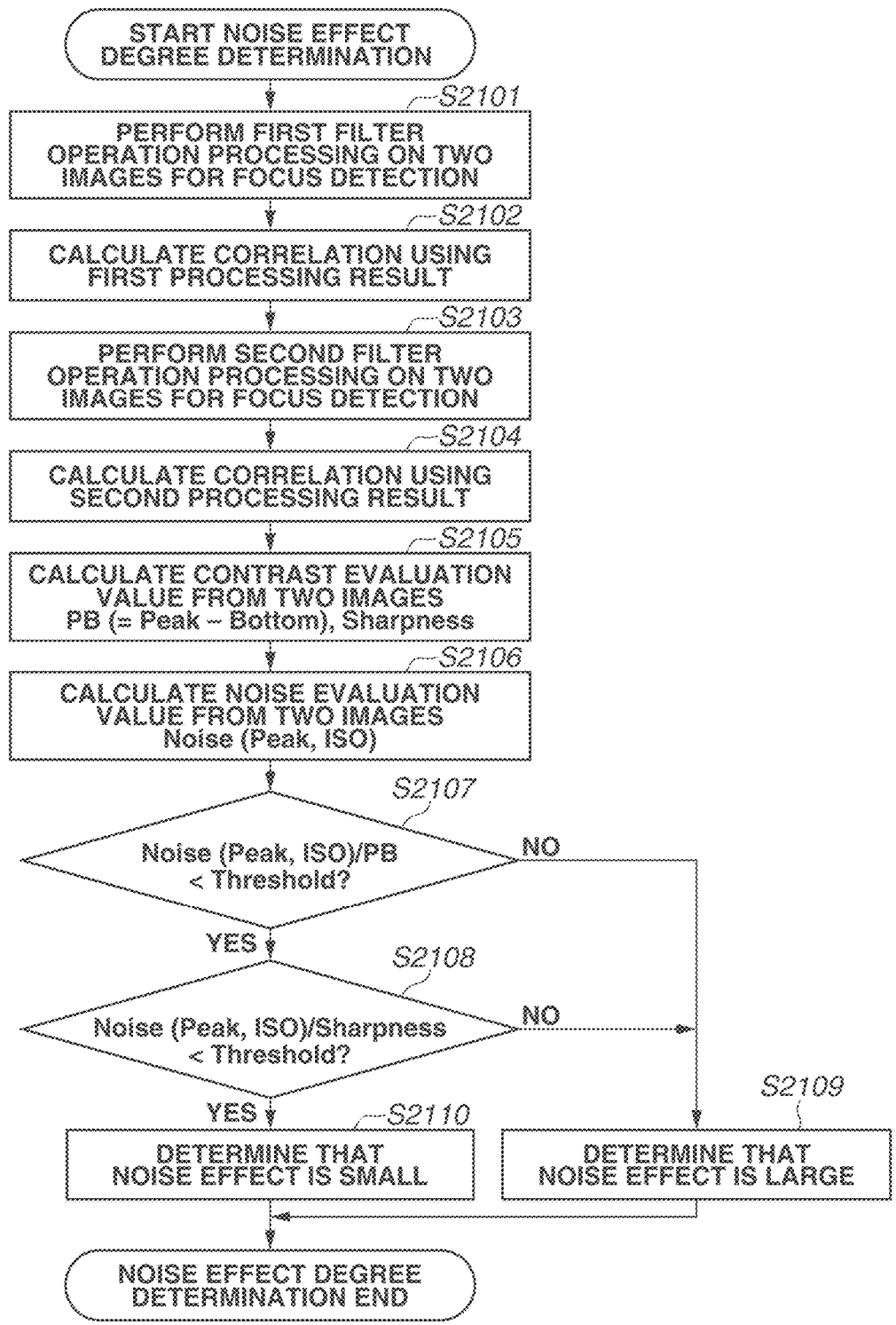
FIG. 11 is a flowchart illustrating a process of determining a degree of effect of noise according to a second exemplary embodiment.

A second exemplary embodiment will be described below with reference to FIG. 11. In the first exemplary embodiment, the degree of effect of noise is determined using the difference between the first and second correlation amounts, and the phase difference is acquired using a band-pass filter having relatively lower frequency characteristics when it is determined that the effect of noise is large.

The second exemplary embodiment differs from the first exemplary embodiment in that the effect of noise is determined based on information about a contrast of a subject and information about noise contamination in image signals. In other words, the configuration of the digital camera system and the focus detection operation (corresponding to the flowchart illustrated in FIG. 9) according to the second exemplary embodiment are similar to those of the first exemplary embodiment, and the sub-routine in step S1903 according to the second exemplary embodiment is different from that of the first exemplary embodiment. FIG. 11 illustrates a flowchart for the sub-routine in step S1903, according to the second embodiment.

In steps S2101 to S2104, like in steps S2001 to S2004 according to the first exemplary embodiment, the first and second filter processing are performed on a pair of image signals, respectively, to acquire the first and second correlation amounts. In the present exemplary embodiment, the degree of effect of noise can be determined without using the first and second correlation amounts in step S1903, and thus this step can be omitted.

Figure 12:
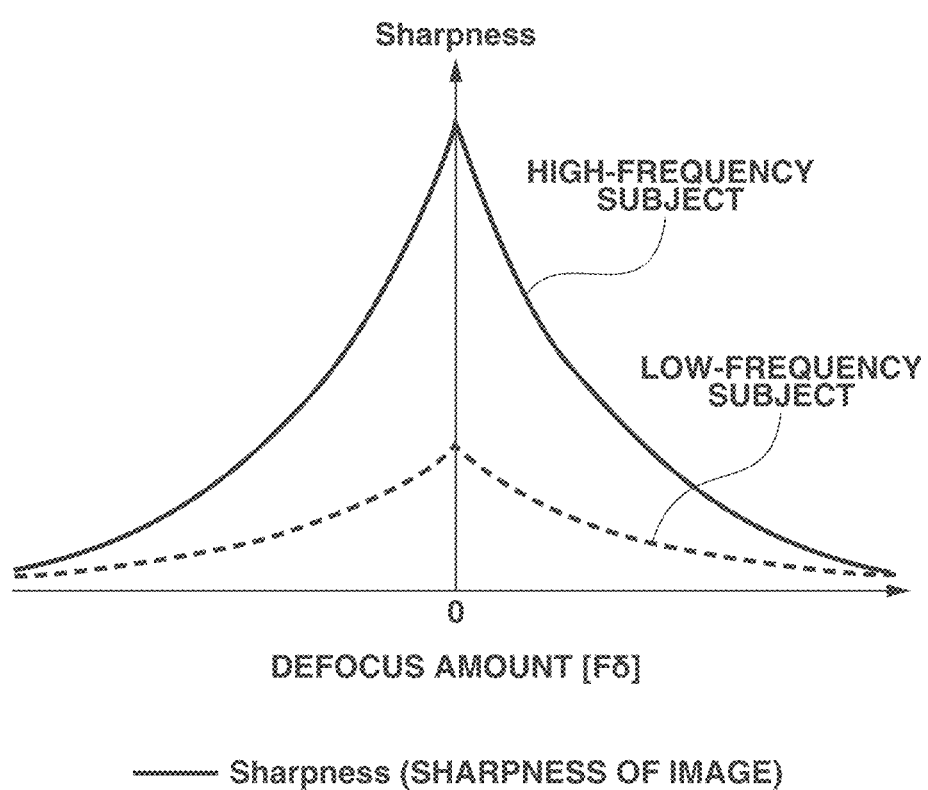
FIG. 12 is a graph illustrating a relationship between a sharpness of an image signal and a defocus amount according to the second exemplary embodiment.

In step S2105, a contrast evaluation value for evaluating the contrast of a pair of image signals is acquired as information about the contrast of a subject. In the present case, a wave form amplitude PB, which is a difference between a maximum value (peak value) and a minimum value (bottom value) of an image signal, is calculated as one of evaluation values. The amplitudes PB of the A image signal and the B image signal are acquired, and the average of the amplitudes is used as an average PB of the pair of image signals. Only the amplitude PB of one of the A image signal and the B image signal may be acquired, and the acquired amplitude may be used as the amplitude PB of the pair of image signals. Further, in step S2105, an evaluation value representing a sharpness of an image is calculated by the following formula as one of contrast evaluation values.

$$Cnt = \frac{\sum_{k=0}^{n-1}(a_k - a_{k+1})^2}{\sum_{k=0}^{n-1}|a_k - a_{k+1}|} \qquad \text{Formula 1}$$

where $a_k$ represents a sub-pixel column signal for focus detection (i.e., A image or B image), and n represents the number of pixels in the sub-pixel column. As an example, FIG. 12 illustrates a relationship between a sharpness and a defocus amount in a high-frequency subject (solid line) and a low-frequency subject (dashed line). FIG. 12 illustrates that a subject image is sharpened as the defocus amount decreases (blurring is reduced), so that the sharpness of the image signal increases. This indicates that even when the defocus amount of the low-frequency subject becomes smaller, the sharpness of the image signal is not increased, compared with the high-frequency subject. When the amount of noise contamination in a pair of image signals is the same, the effect of noise is reduced as the waveform amplitude PB of the image signal becomes larger, or as the image Sharpness of the signal becomes higher.

In the subsequent step S2106, a noise evaluation value for evaluating information about noise contamination in image signals is calculated. In this case, image sensor output values such as dark current noise and photon shot noise, which are noise components of photodiodes, and various setting parameters that may be associated with a gain such as an accumulation time and an ISO sensitivity, which are image pickup conditions, are converted into a table or a formula. A noise evaluation value Noise is calculated based on coefficients provided in the table or formula As a simple calculation, the noise evaluation value depending on photon shot noise and ISO sensitivity is calculated by the following formula.

$$\text{Noise (Peak, ISO)} = \sqrt{\text{Peak} \times \text{ISOGain}} \quad \text{Formula 2}$$

where ISOGain represents a value indicating the amount of gain according to the value of the ISO sensitivity, and Peak represents a maximum value of an image signal. Although not described in the above formula, for example, noise components of fixed patterns generated depending on the difference between the characteristics of vertical readout lines for each column may be listed in the table. The table may be measured in advance for each component as values according to an output value of a focus detection signal, to be used in a calculation.

In the subsequent steps S2107 and S2108, the degree of effect of noise is determined based on the contrast evaluation value and the noise evaluation value which are acquired in step S2105 and step S2106, respectively. In step S2107, it is determined whether the ratio (Noise/PB) between the noise evaluation value Noise and the wave form amplitude PB of the image signal as one of contrast evaluation values is less than a fifth threshold. If the ratio is less than the fifth threshold (YES in step S2107), the processing proceeds to step S2108. On the other hand, if the ratio is equal to or more than the fifth threshold in step S2107 (YES in step S2107), the processing proceeds to step S2109, and it is determined that the degree of effect of noise on the correlation calculation is large.

In step S2108, it is determined whether the ratio (Noise/Sharpness) between the noise evaluation value Noise and the image Sharpness of the focus detection signal is less than a sixth threshold. If the ratio is less than the sixth threshold (YES in step S2108), the processing proceeds to step S2110, and it is determined that the degree of effect of noise on the correlation calculation is small. On the other hand, if it is determined that the ratio is equal to or more than the sixth threshold in step S2108 (NO in step S2108), the processing proceeds to step S2109, and it is determined that the effect of noise on the correlation calculation is large, and thus the sub-routine operation is terminated. If the processing proceeds to step S2109, it is determined that the effect of noise on the correlation calculation is large. Then, the sub-routine operation is terminated, and the processing returns to the flowchart of FIG. 9. If the processing proceeds to step S2109, the processing proceeds to step S1905, and if the processing includes step S2110, the processing proceeds to step S1906. Step S1904 and subsequent steps are the same as those of the first exemplary embodiment. Based on the determination result in step S1903, it is selected whether to acquire the phase difference between two images by the correlation calculation based on the image signals applied to the first or second, filter. However, if the first and second correlation amounts are not acquired by the sub-routine in step S1903, the band-pass filter selected based on the determination result in step S1903 is applied to a pair of image signals, and the phase difference between two images is acquired by the correlation calculation using the pair of image signals processed by the selected filter. Alternatively, the first and second, filter processing may be performed on the pair of image signals before step S1903 is finished. In this case, one of the filter applied to the image signals is selected to carry out the correlation calculation on the basis of the determination result in step S1903. In the present disclosure and specification, Assume herein that a filter is deemed to be selected also when the signal applied to different filter is selected.

Through the operations as described above, the degree of effect of noise on the focus detection can be determined. In addition, by selecting an appropriate filter using the determination result, the focus detection can be performed in which the effect of correlation noise is reduced. In the first exemplary embodiment, the degree of effect of correlation noise is determined based on the result of estimating the degree of correlation noise, while in the second exemplary embodiment, the degree of effect of correlation noise is determined based on the magnitude of noise. The first and second exemplary embodiments can be selectively used in the digital camera systems depending on the scenes. Each scene may be discriminated by the user switching a mode.

Modified Example of Second Exemplary Embodiment

A modified example for step S1903 will now be described. According to the second exemplary embodiment, in step S1903, information about noise (noise evaluation value Noise) and information about a contrast of an image signal (wave form amplitude PB, Sharpness) are acquired, and the degree of effect of noise is determined based on the magnitude of the ratios therebetween (steps S2105 to S2110). Instead of using the individual methods, the following simple method may be used. That is, a threshold is set to the wave form amplitude PB for each ISO sensitivity. If the wave form amplitude PB is less than the threshold, it is determined that the effect of noise is large, and if the wave form amplitude PB is equal to or more than the threshold, it is determined that the effect of noise is small. The thresholds for the wave form amplitude PB set for each ISO sensitivity may be converted into a table and stored. With this method, the degree of effect of noise can be determined only with reference to the wave form amplitude PB and a filter can be selected based on the determination result. Even in the case where the degree of effect of noise is determined by using the threshold set to any one of information about a contrast and information about noise, the degree of effect of noise is deemed to be determined on the basis of the information about noise and the information about a contrast.

Examples of the information about noise include image sensor output values such as dark current noise and photon shot noise, which are noise components of photodiodes, and an accumulation time and ISO sensitivity which are image capturing conditions. The noise evaluation value may be set using a plurality of pieces of information selected from among the pieces of information described above, or may be set using only a single piece of information (e.g., ISO sensitivity).

In addition, a filter may be selected depending on information indicating whether the subject is susceptible to noise. In general, a person's face or the like is a subject that includes a portion having a high spatial frequency and a portion having an extremely low spatial frequency, and the subject is extremely susceptible to noise in a portion having a low spatial frequency. Accordingly, the focus detection apparatus including a unit for detecting the position, size, detection reliability, and the like of a face present within an angle of field in addition to the configuration according to the present exemplary embodiment, may select a filter according to face detection information and image pickup conditions. Specifically, if the ISO sensitivity, which is an image pickup condition, is equal to or higher than a predetermined value and an area in which a face is detected and a focus detection area are superimposed on each other, it is determined that the degree of effect of noise is large and a filter having a relatively low frequency characteristic is selected.

A modified example of the image sensor according to the first and second exemplary embodiments will be described. As described above with reference to FIG. 3A, the image sensor has a configuration in which each unit pixel includes a set of the first focus detection pixel S1, the second focus detection pixel S2, and the microlens ML and h pixels in the horizontal direction and v pixels in the vertical direction are arranged. However, the configuration of the image sensor is not limited to this configuration, and the unit pixels and normal pixels which are not divided on the exit pupil surface may coexist. Even in this configuration, advantageous effects similar to those described above can be obtained.

Exemplary embodiments described above are merely representative examples. Various modifications and alterations can be made on the exemplary embodiments without departing from the scope of the appended claims.

Accordingly, it is possible to provide a focus detection apparatus capable of performing focus detection while reducing an effect of noise.

Other Embodiments

One or more embodiment(s) of the present disclosure can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the inventive concepts described herein are not limited to the disclosed exemplary embodiments. The scope of the following claims is to be accorded the broadest interpretation so as to encompass all modifications and equivalent structures and functions.

This application claims the benefit of Japanese Patent Application No. 2017-025380, filed Feb. 14, 2017, which is hereby incorporated by reference herein in its entirety.

What is claimed is:

1. A focus detection apparatus comprising:
    a determination unit configured to determine a degree of effect of noise included in a pair of parallax image signals; and
    an acquisition unit configured to acquire information about a phase difference between the pair of parallax image signals based on a calculation of correlation between the pair of parallax image signals,
    wherein the acquisition unit selects, based on a determination result of the determination unit, a filter used to acquire the information about the phase difference from among a plurality of filters having different frequency characteristics, and outputs, as a focus detection result, the information about the phase difference acquired by the correlation calculation based on the pair of parallax image signals applied to the selected filter.

2. The focus detection apparatus according to claim 1, wherein, when the determination unit determines that the degree of effect of noise is equal to or greater than a predetermined degree, the acquisition unit selects a first filter as a filter used to acquire information about an image shift amount, and when the determination unit determines that the degree of effect of noise is less than the predetermined degree, the acquisition unit selects a second filter as the filter used to acquire the information about the image shift amount,
    wherein the second filter is configured to transmit frequency components lower than frequency components transmitted by the first filter.

3. The focus detection apparatus according to claim 2, wherein the determination unit determines the degree of effect of noise based on a difference between a third correlation amount acquired by a correlation calculation based on the pair of parallax image signals using a third filter and a fourth correlation amount acquired by a correlation calculation based on the pair of parallax image signals using a fourth filter configured to transmit frequency components lower than frequency components transmitted by the third filter.

4. The focus detection apparatus according to claim 2, wherein the determination unit determines the degree of effect of noise based on a difference between a first correlation amount acquired by a correlation calculation based on the pair of parallax image signals using the first filter and a second correlation amount acquired by a correlation calculation based on the pair of parallax image signals using the second filter.

5. The focus detection apparatus according to claim 3 wherein the determination unit uses information about an intensity of at least one of signals constituting the pair of parallax image signals, to determine the degree of effect of noise.

6. The focus detection apparatus according to claim 5, wherein the information about the intensity of the at least one of signals is at least one of a maximum value of the intensity of the signals and an average value of the intensity of the signals.

7. The focus detection apparatus according to claim 1, wherein the determination unit determines the degree of effect of noise included in the pair of parallax image signals based on information about a contrast of the pair of parallax image signals and information about noise.

8. The focus detection apparatus according to claim 1, wherein the information about the contrast is at least one of an amplitude and a sharpness of at least one of image signals constituting the pair of parallax image signals.

9. The focus detection apparatus according to claim 7, wherein the information about the noise is at least one of a noise component caused by an image sensor used to acquire the pair of parallax image signals and a set value for a gain component applied to the pair of parallax image signals.

10. The focus detection apparatus according to claim 9, wherein the set value for the gain component is at least one of a sensitivity and an accumulation time for accumulating electric charges when the pair of parallax image signals is acquired.

11. The focus detection apparatus according to claim 7, wherein the determination unit determines the degree of effect of noise by comparing an evaluation value acquired based on the information about the contrast of the pair of parallax image signals with a threshold determined based on the information about the noise in the pair of parallax image signals.

12. The focus detection apparatus according to claim 11, wherein when the evaluation value is greater than the threshold, the determination unit determines that the degree of effect of noise is equal to or lower than a predetermined value, and when the evaluation value is equal to or less than the threshold, the determination unit determines that the degree of effect of noise is higher than the predetermined value.

13. The focus detection apparatus according to claim 1, wherein the acquisition unit acquires the pair of parallax image signals applied to the selected filter, by performing filter processing using the selected filter on the pair of parallax image signals.

14. The focus detection apparatus according to claim 1, wherein the acquisition unit acquires a plurality of pairs of parallax image signals applied to a plurality of filters, by performing filter processing using the plurality of filters on the pair of parallax image signals, and acquires information about the image shift amount by selecting the pair of parallax image signals applied to the selected filter from among the plurality of pairs of parallax image signals and carrying out the correlation calculation based on the selected pair of parallax image signals.

15. The focus detection apparatus according to claim 1, wherein
the acquisition unit acquires a plurality of pairs of parallax image signals applied to a plurality of filters, by performing filter processing using the plurality of filters on the pair of parallax image signals,
the acquisition unit acquires a plurality of pieces of information about the image shift amount by correlation calculations based on the plurality of pairs of parallax image signals, and
the acquisition unit acquires information about the image shift amount by selecting information about the image shift amount by a correlation calculation based on the pair of parallax image signals applied to the selected filter from among the plurality of pieces of information about the image shift amount.

16. The focus detection apparatus according to claim 1, wherein
the determination unit uses sensitivity for image capturing to acquire the pair of parallax image signals to determine the degree of effect of noise.

17. The focus detection apparatus according to claim 1, wherein
the determination unit uses an exposure value (EV) for image capturing to acquire the pair of parallax image signals to determine the degree of effect of noise.

18. The focus detection apparatus according to claim 1, wherein
the pair of parallax image signals is based on a signal generated by photoelectrically converting light from an image pickup optical system.

19. The focus detection apparatus according to claim 1, wherein the information about the phase difference is at least one of a defocus amount and a drive amount necessary for causing a lens included in the image pickup optical system to move to an in-focus position.

20. An image pickup apparatus comprising:
an image sensor configured to obtain a pair of parallax image signals by photoelectrically converting light from an image pickup optical system; and
a focus detection apparatus comprising:
a determination unit configured to determine a degree of effect of noise included in the pair of parallax image signals; and
an acquisition unit configured to acquire information about a phase difference between the pair of parallax image signals based on a calculation of correlation between the pair of parallax image signals,
wherein the acquisition unit selects, based on a determination result of the determination unit, a filter used to acquire the information about the phase difference from among a plurality of filters having different frequency characteristics, and outputs, as a focus detection result, the information about the phase difference acquired by the correlation calculation based on the pair of parallax image signals applied to the selected filter.

* * * * *